United States Patent
Ishikawa et al.

[11] Patent Number: 6,134,963
[45] Date of Patent: Oct. 24, 2000

[54] TUNING-FORK TYPE PIEZOELECTRIC VIBRATORY GYROSCOPE

[75] Inventors: Hiroshi Ishikawa; Masanori Yachi, both of Kawasaki; Yoshitaka Takahashi; Tsuyoshi Ogasawara, both of Yokohama; Yoshio Satoh, Kawasaki, all of Japan

[73] Assignee: Fujitsu Limited, Kawasaki, Japan

[21] Appl. No.: 09/040,409

[22] Filed: Mar. 18, 1998

[30] Foreign Application Priority Data

Sep. 17, 1997 [JP] Japan ................................. 9-251759

[51] Int. Cl.[7] .................................................. G01P 9/00
[52] U.S. Cl. ........................................ 73/504.16; 310/370
[58] Field of Search ........................... 73/504.16, 504.15, 73/504.12, 504.04; 310/316, 329, 370

[56] References Cited

U.S. PATENT DOCUMENTS

| | | | |
|---|---|---|---|
| 4,004,166 | 1/1977 | Nakata | 310/8.2 |
| 4,131,816 | 12/1978 | Nakata | 310/348 |
| 4,220,885 | 9/1980 | Yamashita et al. | 310/370 |
| 5,128,581 | 7/1992 | Nakayama et al. | 73/514.34 |
| 5,386,726 | 2/1995 | Terajima | 73/504.16 |
| 5,719,460 | 2/1998 | Watarai et al. | 310/370 |
| 5,757,107 | 5/1998 | Wakatuki et al. | 310/370 |
| 5,824,900 | 10/1998 | Konno et al. | 73/504.16 |
| 5,854,427 | 12/1998 | Terada et al. | 73/504.16 |

FOREIGN PATENT DOCUMENTS 5-026889  2/1993  Japan.
6-323928  11/1994  Japan.

*Primary Examiner*—Helen C. Kwok
*Attorney, Agent, or Firm*—Armstrong, Westerman, Hattori, McCleland & Naughton

[57] ABSTRACT

A tuning-fork type piezoelectric vibratory gyroscope includes a tuning fork having two arms and a base portion integrally formed with the two arms and having electrodes, and a supporting base supporting the base portion of the tuning fork. An adhesive layer joins the base portion and the supporting base together so that the tuning fork and the supporting plate are elastically integrated within a temperature range in which the gyroscope is used.

13 Claims, 19 Drawing Sheets

IN-PLANE
VIBRATION

L=3.5,W=4,w=0.7,t=1

(4)L=3.5,l=2.6,W=4,w=0.7

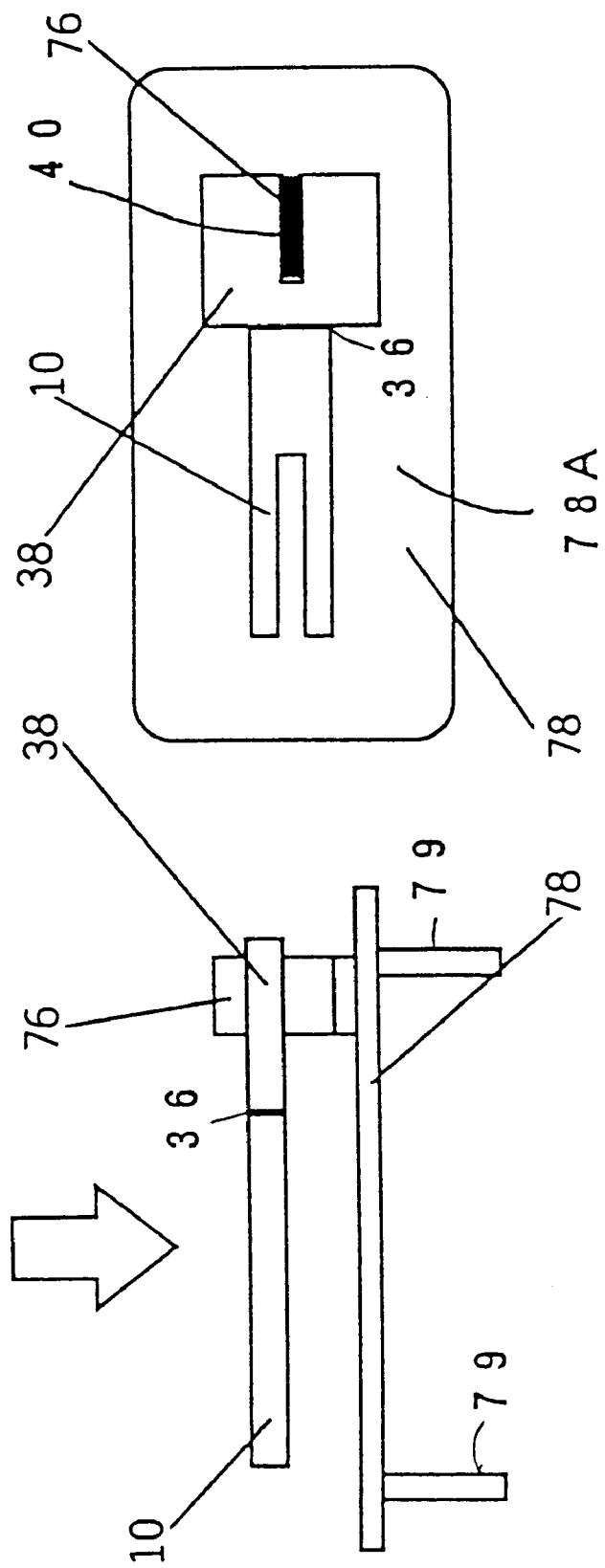

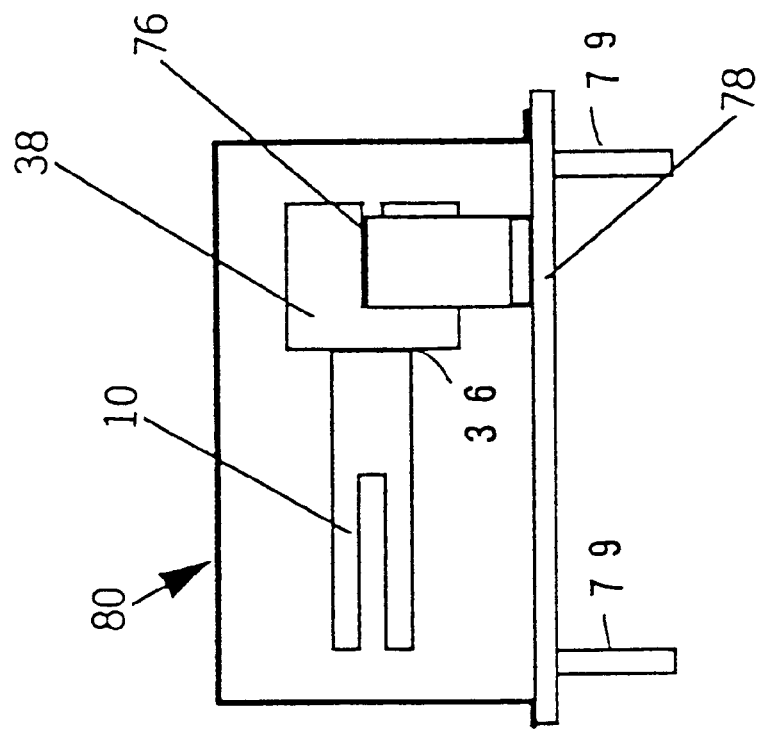
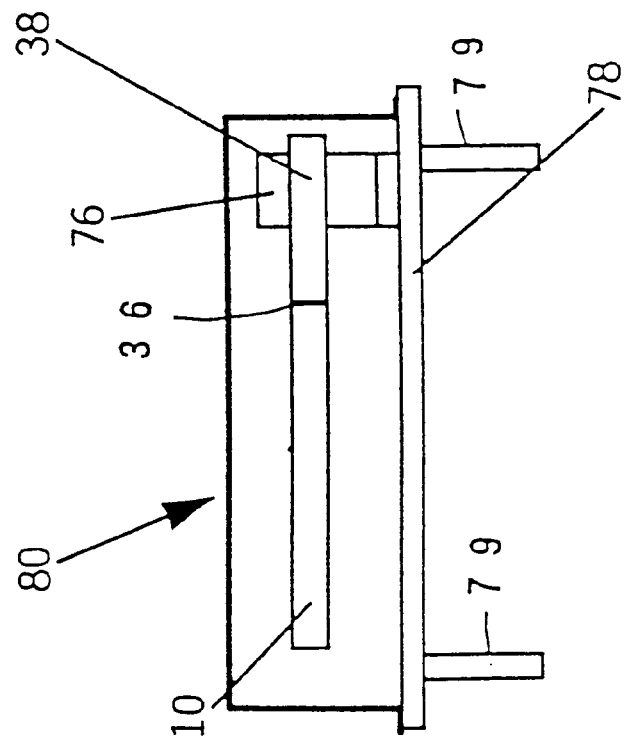
FIG. 15A
FIG. 15B

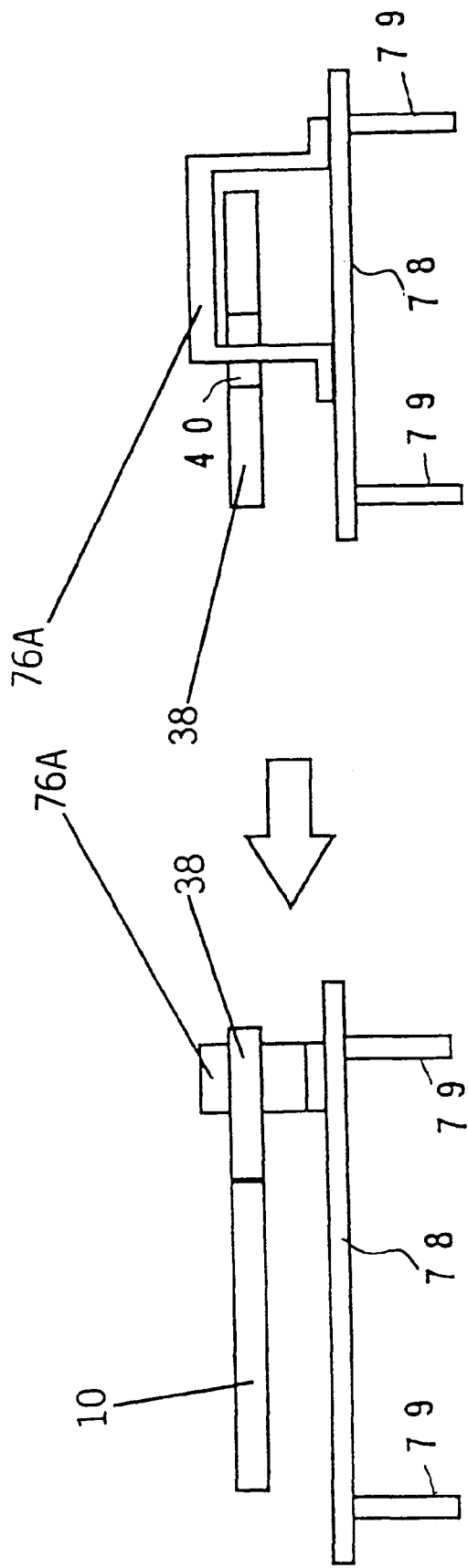

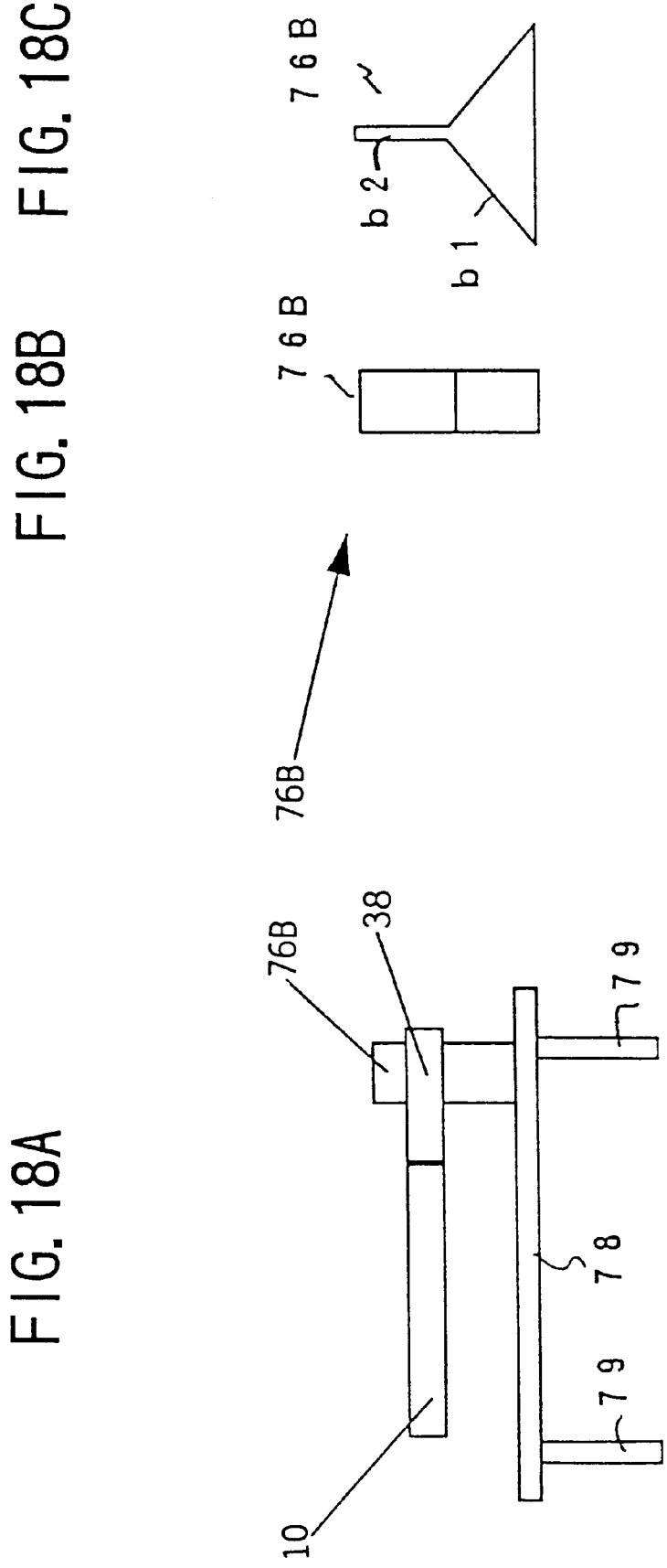

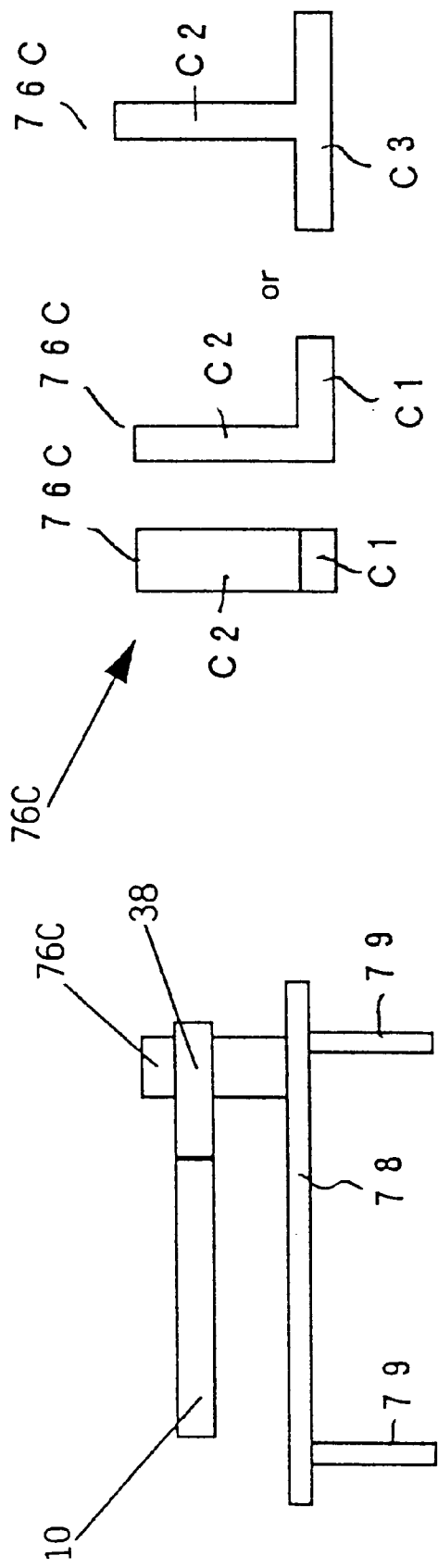

TUNING-FORK TYPE PIEZOELECTRIC VIBRATORY GYROSCOPE

BACKGROUND OF THE INVENTION

1. Field of the Invention

The present invention generally relates to vibratory gyroscopes used to detect the angular velocity in various devices such as vibration detection in video cameras and still cameras, car navigation systems and vehicle attitude control. More particularly, the present invention is concerned with a tuning-fork type piezoelectric vibratory gyroscope equipped with a tune for, made of a piezoelectric substance such as a piezoelectric single crystal and piezoelectric ceramics.

2. Description of the Related Art

Various tuning-fork type vibratory gyroscopes are known, and a vibratory gyroscope which employs a piezoelectric single crystal such as $LiTaO_3$ or $LiNbO_3$ has recently been proposed.

FIGS. 1A and 1B show a conventional vibratory gyroscope having a piezoelectric single crystal. The gyroscope has a tuning fork (vibrator) 10, which has two arms 12 and 14 and a base portion 15 and is formed of a piezoelectric crystal. Drive electrodes 16, 18, 20 and 22 and detection electrodes 24, 26, 28, 30, 32 and 34 are provided on surfaces of the tuning fork 10, as shown in FIGS. 1A and 1B. A driving source OSC is connected between the drive electrodes 16 and 18 in order to cause a drive-side vibration. The drive electrodes 20 and 22 opposite the drive electrodes 16 and 18 are grounded. The detection electrodes 24, 26, 28, 30, 32 and 34 are connected as shown in FIGS. 1A and 1B so that two signals are output.

When the tuning fork 10 is driven, the two arms 12 and 14 start vibrating, as shown in the left side of FIG. 2. The vibration of the two arms 12 and 14 is called an in-plane vibration. If the gyroscope is rotated about the Z axis in the above state, a Coriolis force is generated in the Y-axis directions perpendicular in the X-axis directions, and the arms 12 and 14 are vibrated in the Y-axis directions with a magnitude proportional to the Coriolis force. The vibration caused in the Y-axis direction are called a surface-perpendicular vibration. The Coriolis force is proportional to the angular velocity, which can thus be detected by detecting an output signal proportional to the magnitude of the vibration caused in the Y-axis directions.

The tuning-fork type piezoelectric gyroscope shown in FIGS. 1A and 1B is disclosed in, for example, Japanese Laid-Open Patent Application No. 8-128830. This Application further discloses that the tuning fork shown in FIGS. 1A and 1B is attached to a supporting member so that the tuning fork and the supporting member are integrally vibrated due to the Coriolis force. The Application shows that, by changing the shape of the supporting member, the stiffness can be changed and the detection-side vibration can be sufficiently attenuated at an and portion of the supporting member.

The tuning-fork type vibratory gyroscope shown in FIGS. 1A and 1B has the following disadvantages. The above-mentioned Japanese Patent Application does not disclose any consideration of the relationship between the temperature range in which the gyroscope is used and the performance of the gyroscope. The inventors found that the temperature of the gyroscope and the performance thereof has a close relationship. More particularly, the vibration mode is changed at a certain temperature, and causes unwanted vibrations. In this case, the unwanted vibrations appear a leakage voltage in the detection signal, and the performance of the gyroscope is degraded.

Further, the Application discloses that the resonance frequency of the detection-side vibration can be changed by changing the shape of the supporting member to which the tuning fork is attached. However, the Application fails to disclose the relationship between the drive-side resonance and the detection-side resonance, particularly the relationship between the detection sensitivity and the frequency difference between the drive-side vibration and the detection-side vibration.

Furthermore, the Application discloses that the gyroscope and a wiring board, on which a detection circuit for processing the detection signals of the gyroscope is formed, are electrically connected together by wire bonding. However, the operationability of wire bonding is not good.

SUMMARY OF THE INVENTION

It is a general object of the present invention to provide an improved tuning-fork type piezoelectric vibratory gyroscope in which the above disadvantages are eliminated.

A more specific object of the present invention is to provide a tuning-fork type piezoelectric vibratory gyroscope having stable performance in a used temperature range, high detection precision and improved productionability.

The above objects of the present invention are achieved by a tuning-fork type piezoelectric vibratory gyroscope comprising: a tuning fork having two arms and a base portion integrally formed with the two arms and having electrodes: a supporting base supporting the base portion of the tuning fork; and an adhesive layer which joins the base portion and the supporting base together so that the tuning fork and the supporting plate are elastically integrated within a temperature range in which the gyroscope is used.

The vibratory gyroscope may be configured so that: the adhesive layer comprises one of glass and epoxy resin; and the adhesive layer has a glass transition point temperature higher than a maximum temperature at which the gyroscope can be used.

The vibratory gyroscope may be configured so that an absolute value of a difference between a resonance frequency of a drive-side vibration of the gyroscope and that of a detection-side vibration thereof is equal to or less than a predetermined threshold value.

The vibratory gyroscope may be configured so that an absolute value of a difference between a resonance frequency of a drive-side vibration of the gyroscope and that of a detection-side vibration thereof is equal to or less than 1.3 kHz.

The vibratory gyroscope may be configured so that it further comprises: drive electrodes provided on the tuning fork; detection electrodes provided on the tuning fork; and at least one flexible wiring board for external connections with the drive and detection electrodes.

The vibratory gyroscope may be configured so that the above-mentioned at least one flexible wiring board is connected to leads provided on the tuning fork and connected to the drive and detection electrodes.

The vibratory gyroscope may be configured so that the above-mentioned at least one flexible wiring board is connected, by soldering or an electrically conductive adhesive, to leads provided on the tuning fork and connected to the drive and detection electrodes.

The vibratory gyroscope may be configured so that the above-mentioned at least one flexible wiring board is connected to leads provided on the supporting base and connected to the drive and detection electrodes.

The vibratory gyroscope may be configured so that the at least one flexible wiring board is connected, by soldering or an electrically conductive adhesive, to leads provided on the tuning fork and connected to the drive and detection electrodes.

The vibratory gyroscope may be configured so that: the supporting base has a slit; the vibratory gyroscope has a supporting member which passes through the slit and is attached to the supporting base by an elastic adhesive; and the vibratory gyroscope can be attached to a stem so that the two arms of the tuning fork face the stem.

The vibratory gyroscope may be configured so that the supporting member is attached to the stem by one of soldering and welding.

The vibratory gyroscope may be configured so that it further comprises a cap which hermetically seals the tuning fork and the supporting base.

The vibratory gyroscope may be configured so that it further comprises a cap which hermetically seals the turning fork and the supporting base, the supporting member being fixed to the stem and the cap.

The vibratory gyroscope may be configured so that: the supporting member has a first portion which is to be fixed to the stem, and a second portion attached to the supporting base; and the first portion has an area or a shape which is greater than that of the second portion.

BRIEF DESCRIPTION OF THE DRAWINGS

Other objects, features and advantages of the present invention will become more apparent from the following detailed description when read in conjunction with the accompanying drawings, in which:

FIGS. 14A and 14B are respectively side and plan views of a gyroscope according to a fifth embodiment of the present invention;

FIG. 15A is a cross-sectional view of the fifth embodiment of the present invention in a state in which a cap is provided;

FIG. 15B is a cross-sectional view of a variation of the structure according to the fifth embodiment of the present invention;

FIGS. 16A and 16B are diagrams of a variation of the structure shown in FIGS. 14A and 14B;

FIGS. 18A, 18B and 18C are respectively diagrams of a gyroscope according to a seventh embodiment of the present invention; and FIGS. 19A, 19B, 19C and 19D are respectively diagrams of a variation of the structure shown in FIGS. 18A, 18B and 18C.

DESCRIPTION OF THE PREFERRED EMBODIMENTS

Figure 3:
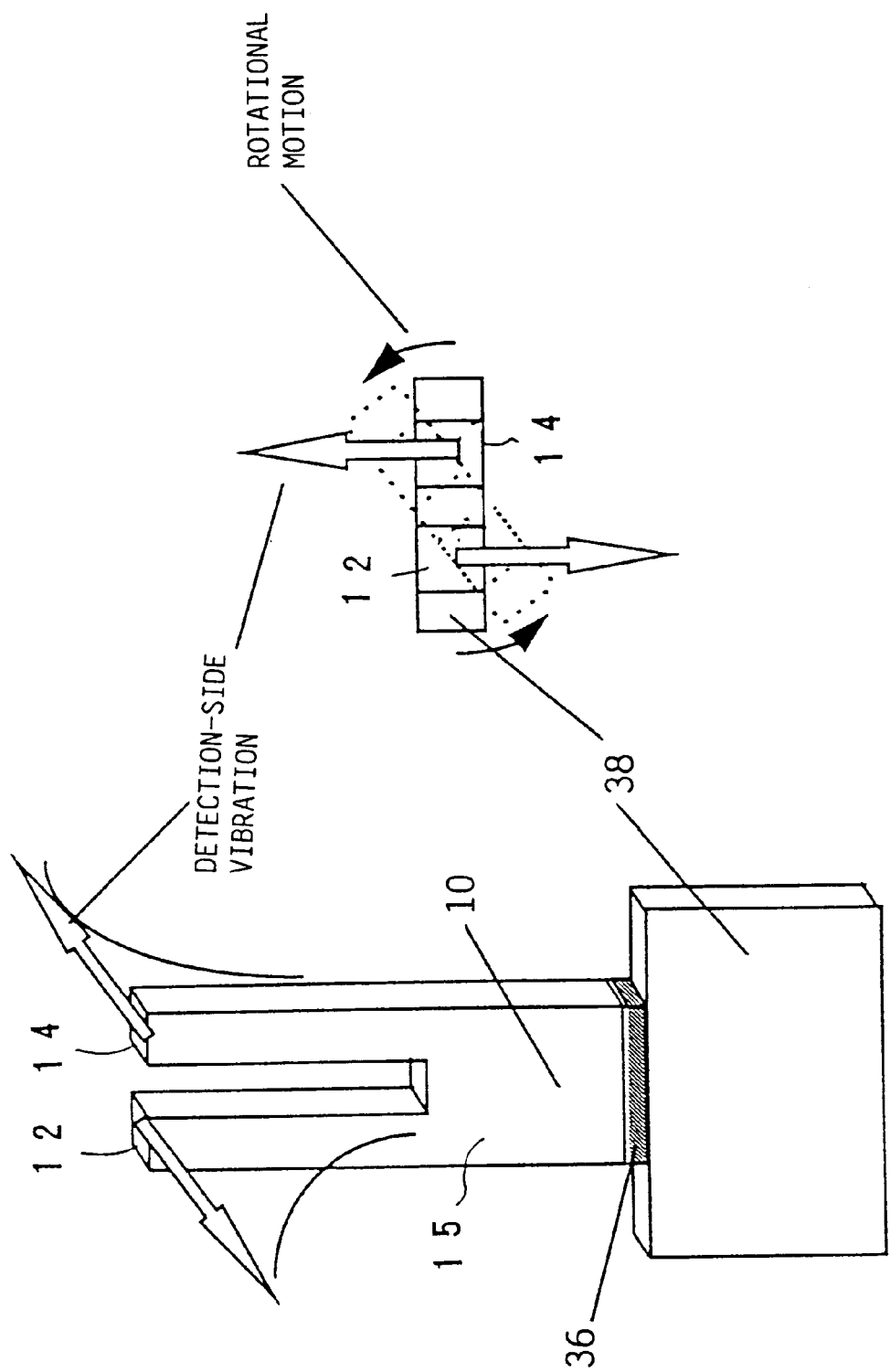
FIG. 3 is a diagram of a structure of a first embodiment of the present invention and a normal operation thereof.

FIG. 3 is a diagram of a tuning-fork type piezoelectric vibratory gyroscope according to a first embodiment of the present invention. In FIG. 3, parts that are the same as those shown in the previously described figures are given the same reference numbers.

The gyroscope shown in FIG. 3 employs an adhesive layer 36 which is provided between the base portion 15 of the tuning fork 10 and a supporting base 38 having a plate shape and which realizes an elastically integral structure of the tuning fork 10 and the supporting base 38 within a usable temperature range of the gyroscope. The adhesive layer 36 is, for example, glass adhesive or epoxy adhesive. The adhesive layer 36 is required to have a glass transition point temperature which is higher than the maximum value of the usable temperature range of the gyroscope. The adhesive layer 36 will be in a glass-like state having a large elastic module if the temperature of the adhesive layer 36 is lower than the glass transition point temperature, and will be in a rubber-like state having an extremely small elastic module if the temperature of the adhesive layer 36 is higher than the glass transition point temperature.

Figure 4:
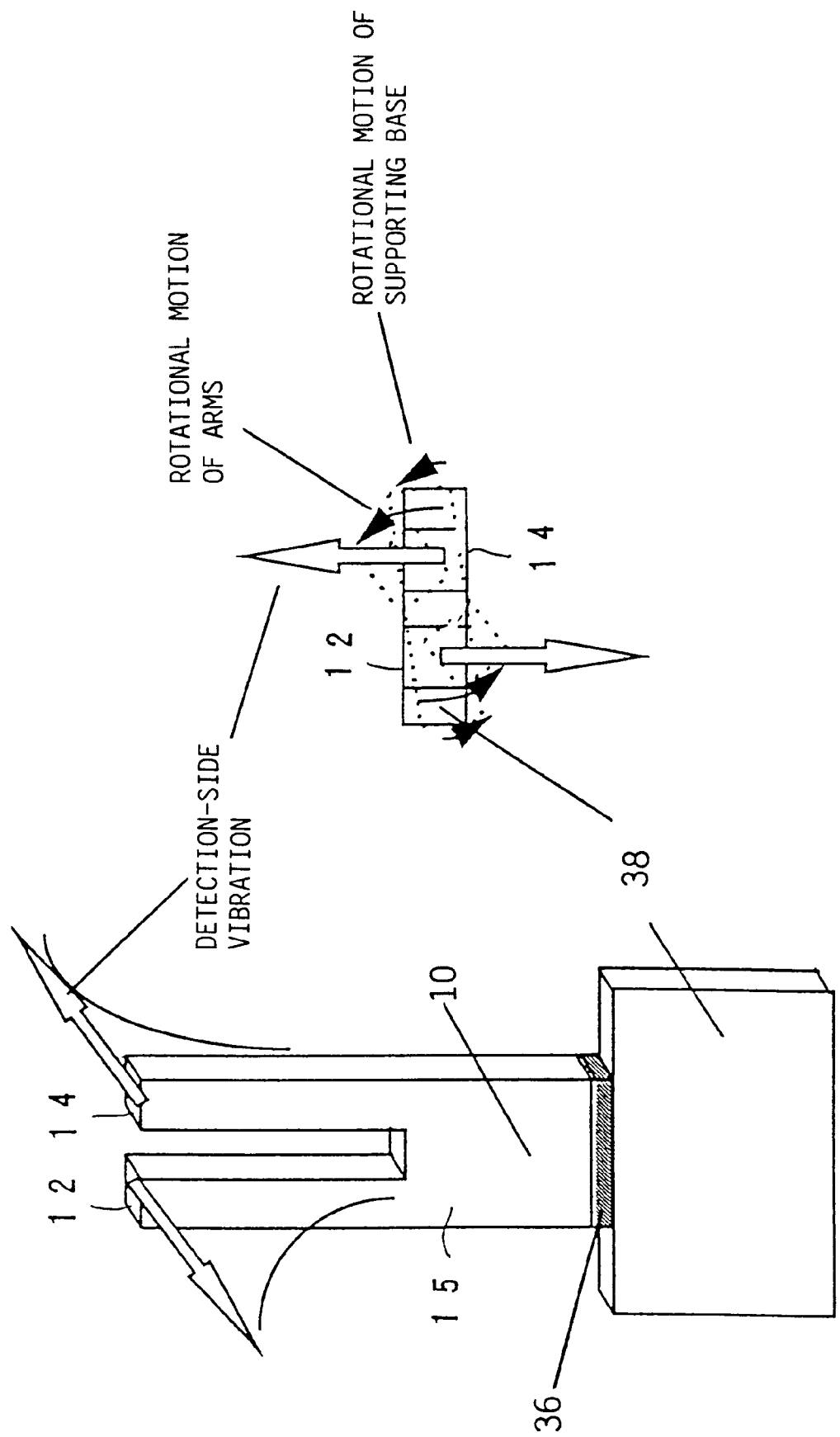
FIG. 4 is a diagram of the structure of the first embodiment of the present invention and a defective operation thereof.

The adhesive layer 36 is comparatively hard in the glass-like state and thus a rotating motion caused by the drive-side vibration and the detection-side vibration occurs as if the tuning fork 10 and the supporting base 38 are joined together by the hard adhesive layer 36. In other words, the tuning fork 10 and the supporting base 38 are integrally vibrated when the adhesive layer 36 is in the glass-like state. In contrast, when the adhesive layer 36 is in the rubber-like state exceeding the glass transition point temperature, the tuning fork 10 and the supporting member are separately vibrated because the adhesive layer 36 is soft. In an example shown in FIG. 4, the rotation of the arms 12 and 14 is greater than that of the supporting base 38. Hence, unwanted vibrations occur and a resultant leakage voltage is superimposed on the detection voltage. This degrades the performance of the gyroscope.

With the above consideration, the adhesive layer 36 is arranged so as to have a glass transition point temperature higher than the maximum temperature of the usable temperature range of the gyroscope. Hence, the tuning fork and the supporting member can integrally be vibrated within the usable temperature range.

The tuning fork 10 is equipped with the aforementioned drive electrodes 16, 18, 20 and 22 and detection electrodes 24, 26, 28, 30, 32 and 34. However, these electrodes are omitted in FIGS. 3 and 4 for the sake of simplicity. Further, leads are provided and connected to the electrodes in a conventional manner as disclosed in Japanese Laid-Open Patent Application No. 8-128830. As will be described later, third and fourth embodiments of the present invention have unique arrangements of leads for making external connections with the drive and detection electrodes.

A description will now be given of a second embodiment of the present invention, which has an unique arrangement in which the absolute value of the resonance frequency of the drive-side vibration and the absolute value of the resonance frequency of the detection-side vibration is equal to or less than a predetermined threshold value, so that the gyroscope having a desired performance can be configured. More particularly, the above resonance frequency difference is reduced in order to efficiently output a detection voltage. This will be described below with reference to FIGS. 5 and 6.

Figure 5:
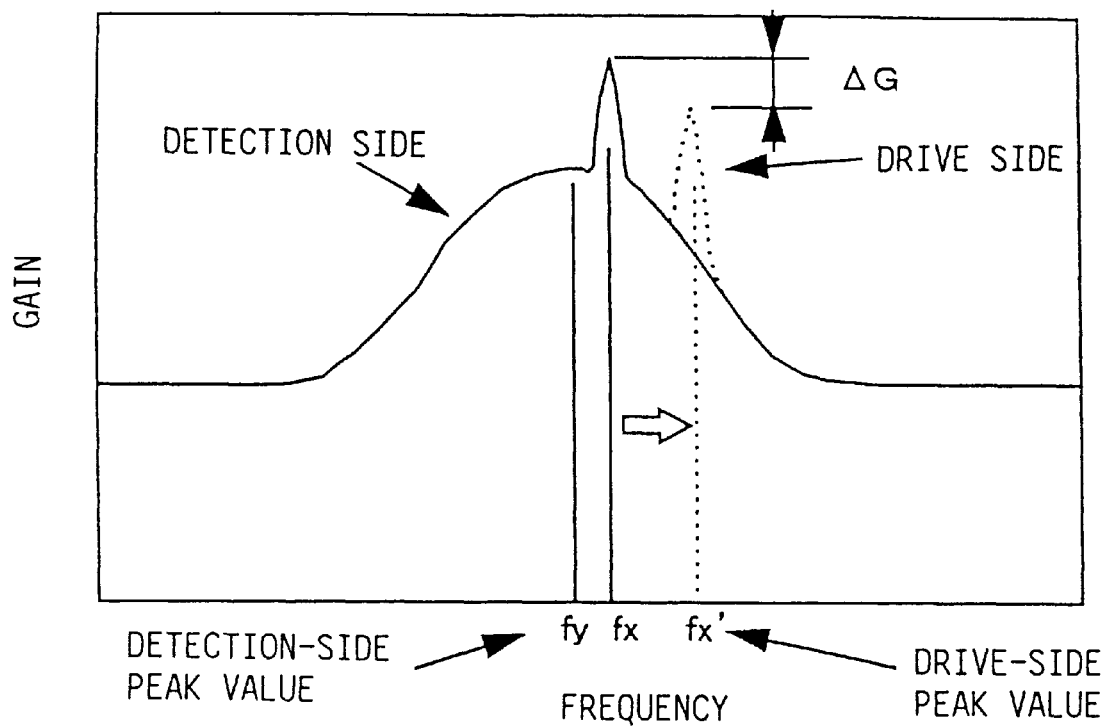
FIG. 5 is a graph of a relationship between a drive-side resonance frequency and a detection-side resonance frequency.
Figure 6:
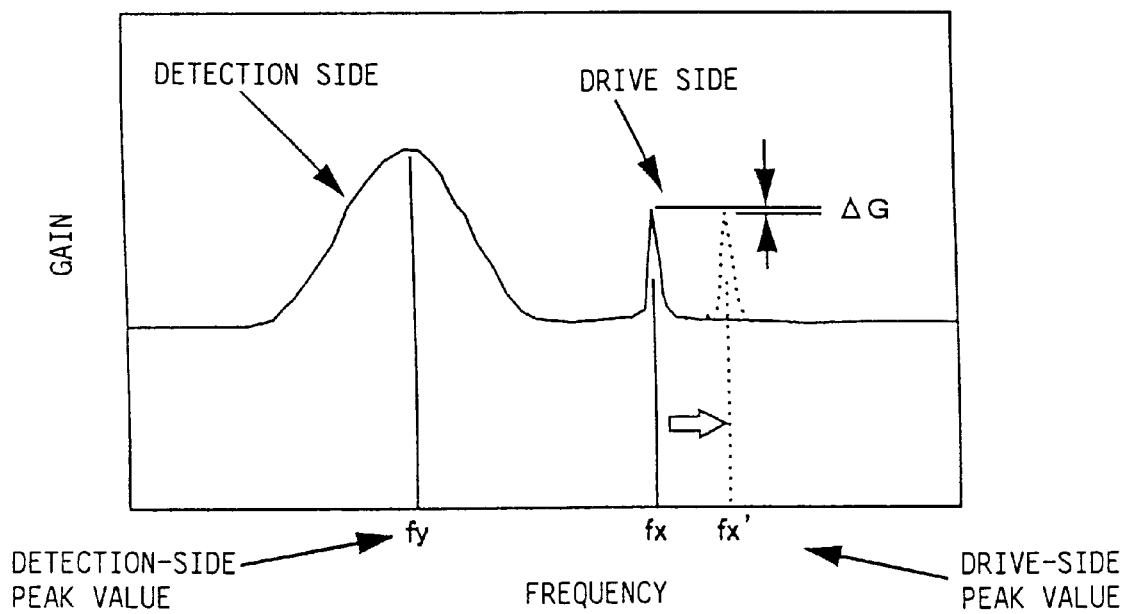
FIG. 6 is another graph of the relationship between the drive-side resonance frequency and the detection-side resonance frequency.

FIGS. 5 and 6 are graphs of frequency characteristics showing the resonance frequency of the drive-side vibration and the resonance frequency of the detection-side vibration. FIG. 5 shows a case in which the sensitivity of the gyroscope is comparatively high. In FIGS. 5 and 6, a symbol fx denotes the resonance frequency of the drive-side vibration, and a symbol fy denotes the resonance frequency of the detection-side vibration. As shown in FIG. 5, in the case where the sensitivity of the gyroscope is comparatively high, if the resonance frequency of the drive-side vibration and the resonance frequency of the detection-side vibration has a small difference, the gain G will greatly be changed (delta G) due to even a small variation in the resonance frequency (a case where the resonance frequency of the drive-side vibration is changed from fx to fx'. That is, the peak of the drive-side vibration is located at a relatively high gain portion of the peak of the detection-side vibration. Since the gain G is changed greatly, the detection voltage is unstable. In contrast, as shown in FIG. 6, if a large resonance frequency difference is defined, the detection voltage may not be efficiently obtained as compared with the case shown in FIG. 5 (the gain G of the peak of the resonance frequency of the detection-side vibration is small, as compared with the case shown in FIG. 5. However, the gain G is not greatly changed due to a variation in the resonance frequency (fx→fx'), and thus the detection voltage can be obtained stably.

It is necessary to define the frequency difference |fx-fy| in order to reduce the influence of variation in the resonance frequency. In this case, if the frequency difference |fx-fy| is too large, the sensitivity will be greatly degraded. Hence, it is necessary to define the upper limit of the frequency difference |fx-fy| in order to obtain a sufficient sensitivity.

Figure 7:
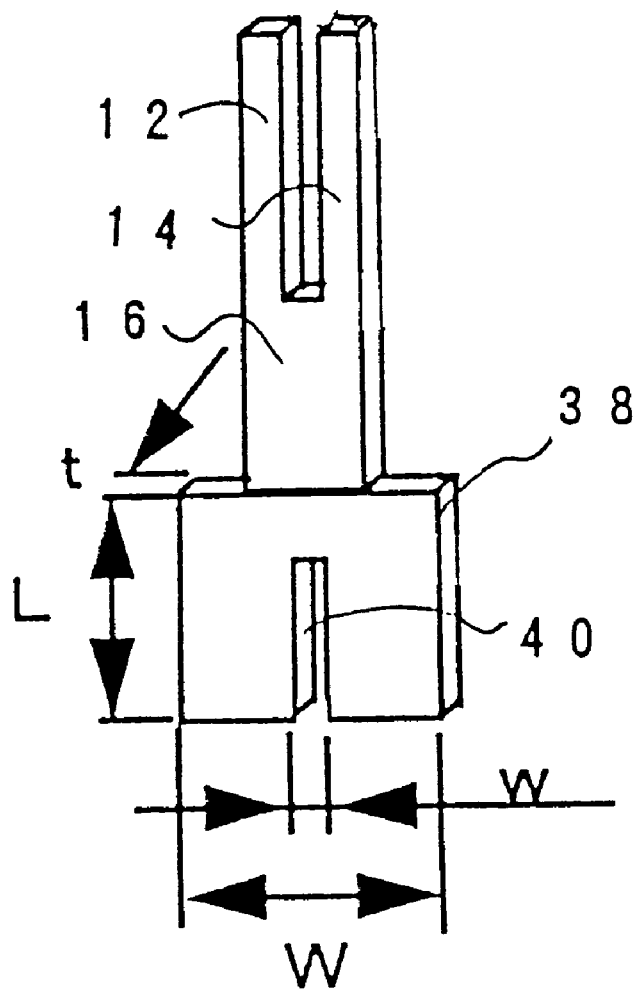
FIG. 7 is a diagram showing parameters related to a second embodiment of the present invention.
Figure 8A:
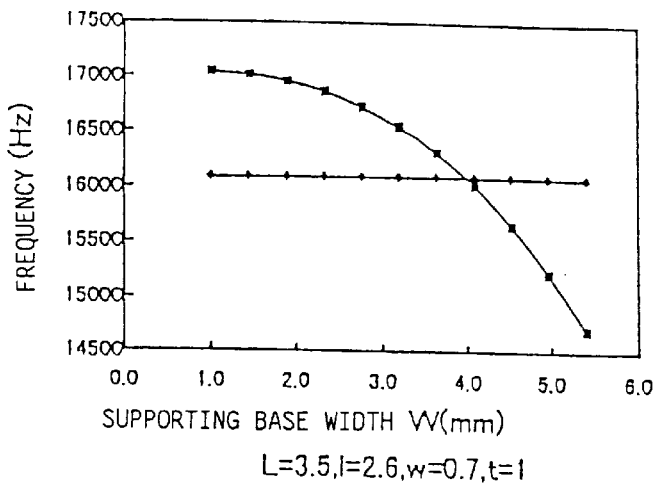
FIGS. 8A, 8B, 8C, 8D and 8E are graphs of relationships between parameters and drive-side and detection-side resonance frequencies.
Figure 8B:
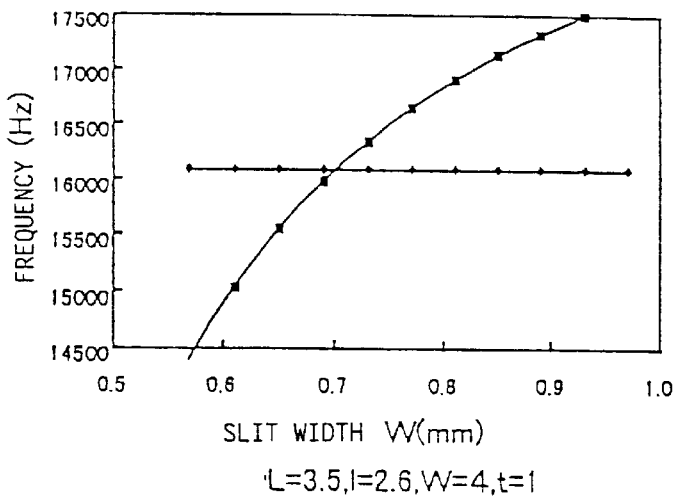
Figure 8C:
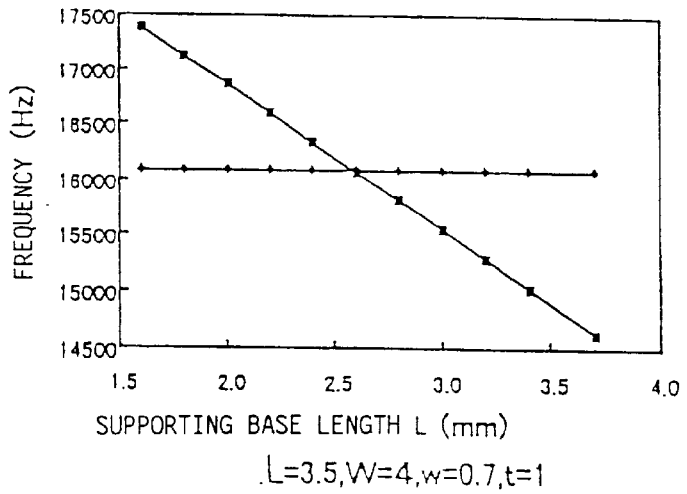
Figure 8D:
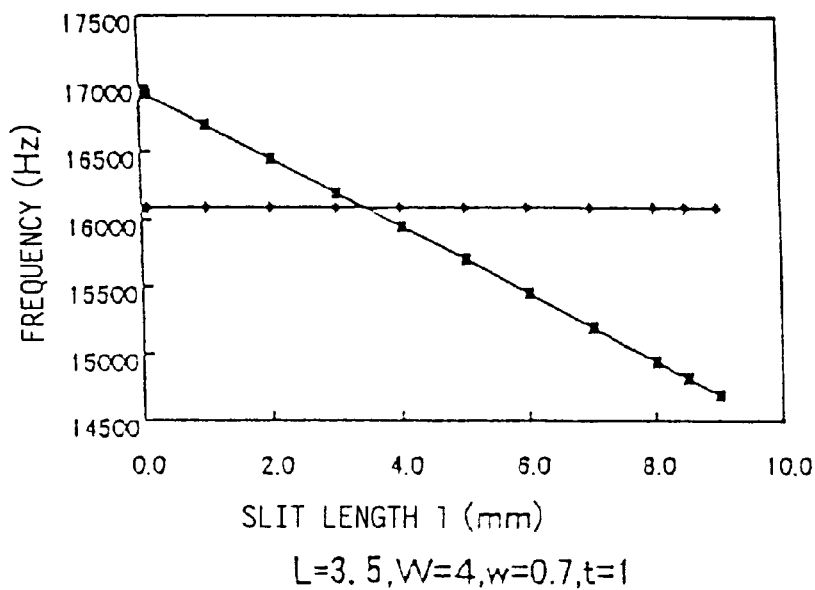
Figure 8E:
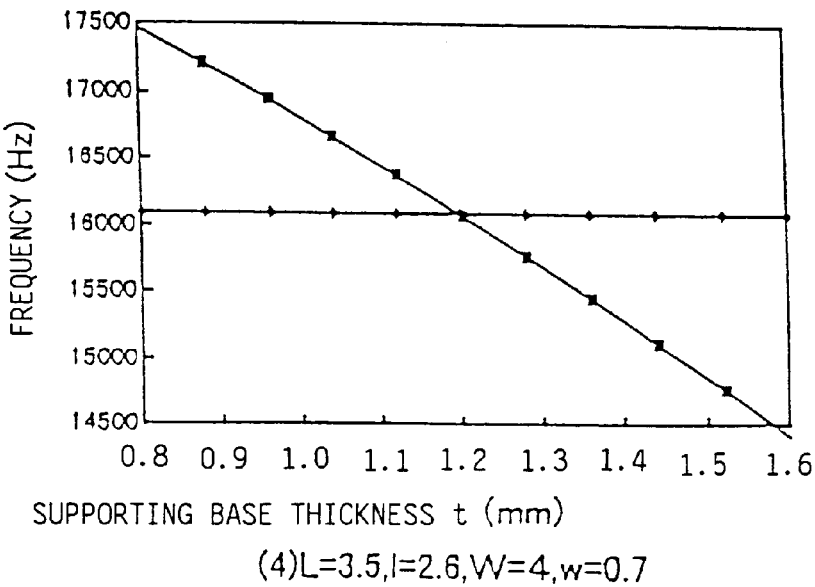

The frequency difference |fx-fy| between the resonance frequency of the drive-side vibration and that of the detection-side vibration can be adjusted by changing the shape of the supporting base 38 so that the resonance frequency of the detection-side vibration can be changed. For example, as shown in FIG. 7, a slit 40 is formed in the supporting base 38. The slit 40 is located on the center line of the supporting member 40 (the center of the rotating motion of the gyroscope). The slit 40 connects the opposing surfaces of the supporting base 38 and has an open end.

FIGS. 8A through 8E are graphs showing relationships between parameters and the resonance frequencies of the drive-side and detection-side vibrations. The parameters shown in FIGS. 8A through 8E are the width W of the supporting base 38, the width w of the slit 40, the length L of the supporting base 38, the length l of the slit 40, and the thickness t of the supporting base 38, respectively. The graphs of FIGS. 8A through 8E are obtained by defining the dimensions shown therein. As shown in these figures, the various combinations of parameters can arbitrarily be defined to adjust the peak position of the resonance frequency of the drive-side vibration so as to be located outside of the peak of the detection-side vibration. Hence, it is possible to provide gyroscopes each suitable for respective operating conditions.

The experiments conducted by the inventors show that the frequency difference |fx-fy| between the resonance frequency of the drive-side vibration and the resonance frequency of the detection-side vibration is equal to or lower than 1.3 kHz. As has been described previously, if the frequency difference |fx-fy| is too large, the sensitivity will greatly be degraded. In this case, it is very difficult to detect the angular velocity. Hence, it is desirable to define the threshold value which is the upper limit to the frequency difference |fx-fy|. According to the inventors' experiments show that the upper limit of the frequency difference |fx-fy| is 1.3 kHz.

A description will now be given, with reference to FIGS. 9, 10A and 10B, of a third embodiment of the present invention, which is directed to a unique arrangement in leads for external connections with the drive and detection electrodes.

Figure 1A:
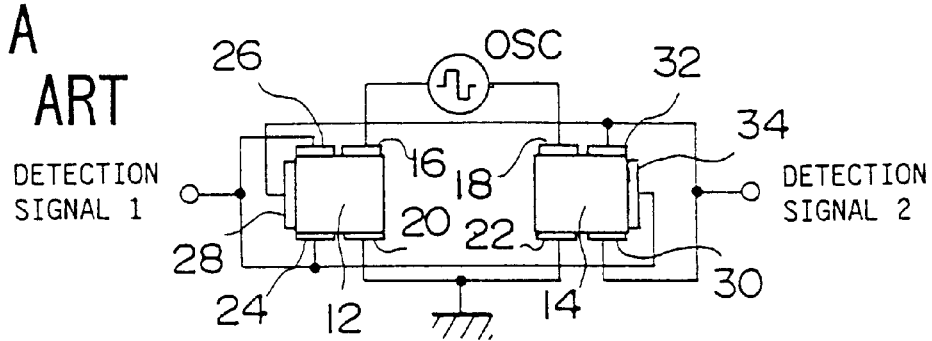
FIGS. 1A and 1B are diagrams of a conventional tuning-fork type piezoelectric vibratory gyroscope.
Figure 1B:
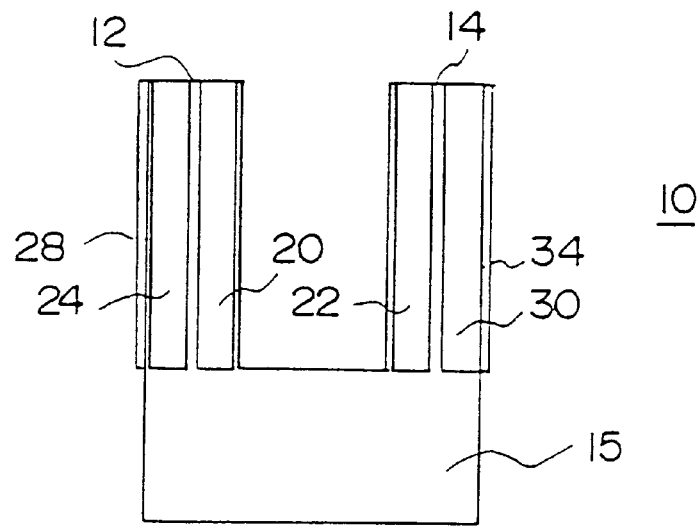
Figure 2:
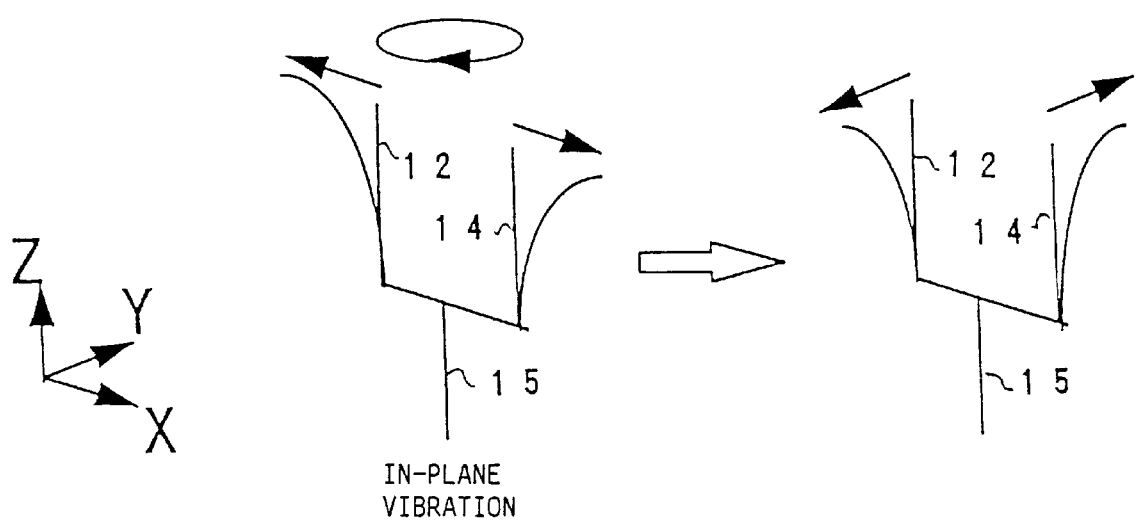
FIG. 2 is a diagram showing an operation of the gyroscope shown in FIGS. 1A and 1B.
Figure 9:
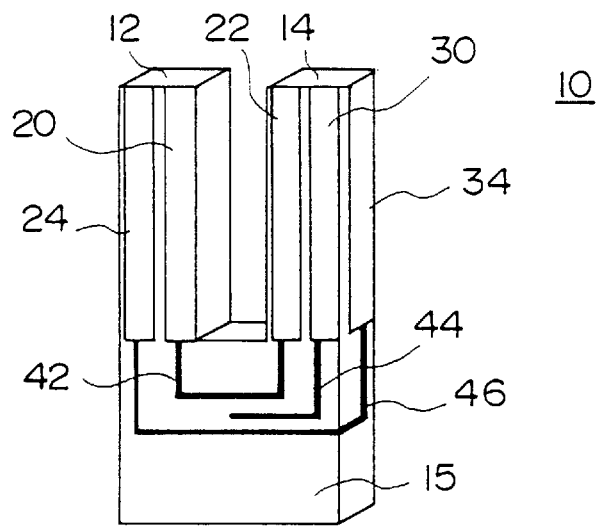
FIG. 9 is a perspective view of a tuning fork used in a third embodiment of the present invention.

FIG. 9 shows the tuning fork or gyroscope 10 according to the third embodiment of the present invention. In FIG. 9, parts that are the same as those shown in the previously described figures are given the same reference numbers. As shown in FIG. 9, leads 42, 44 and 46 are provided on the front surface of the base portion 15 of the tuning fork 10 and implements the connections shown in FIG. 1A. The leads 42 connects the driving electrodes 20 and 22 together, and the lead 46 connects the detection electrodes 24 and 34 together. The lead 44 extends to the center of the base portion 15. Similarly, leads which correspond to the leads 42, 44 and 46 are provided on the back surface of the base portion 15 of the tuning fork 10 in order to implement the connections shown in FIG. 1A.

Figures 10A, 10B:
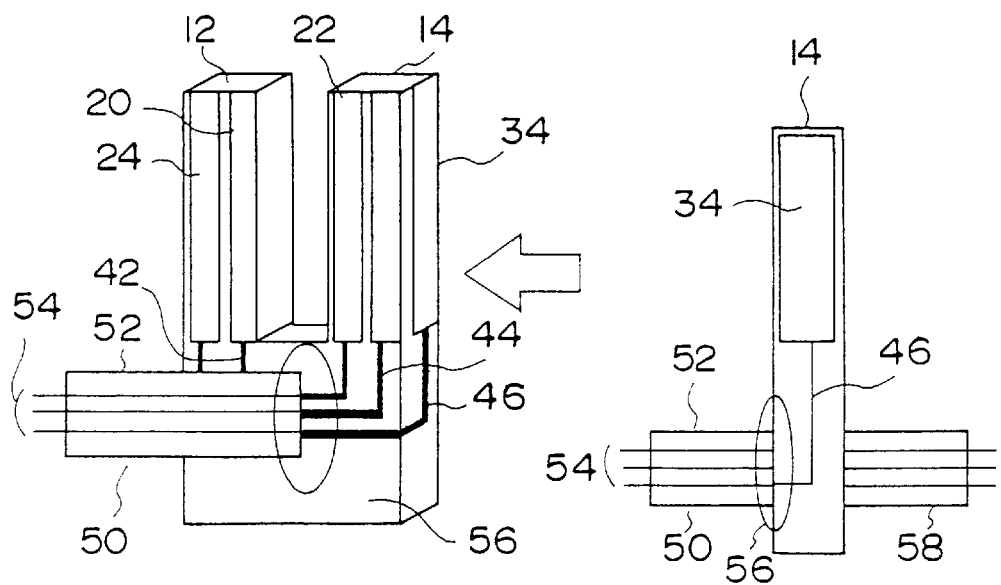
FIGS. 10A and 10B are respectively perspective and side views of a gyroscope according to the third embodiment of the present invention.
Figure 11:
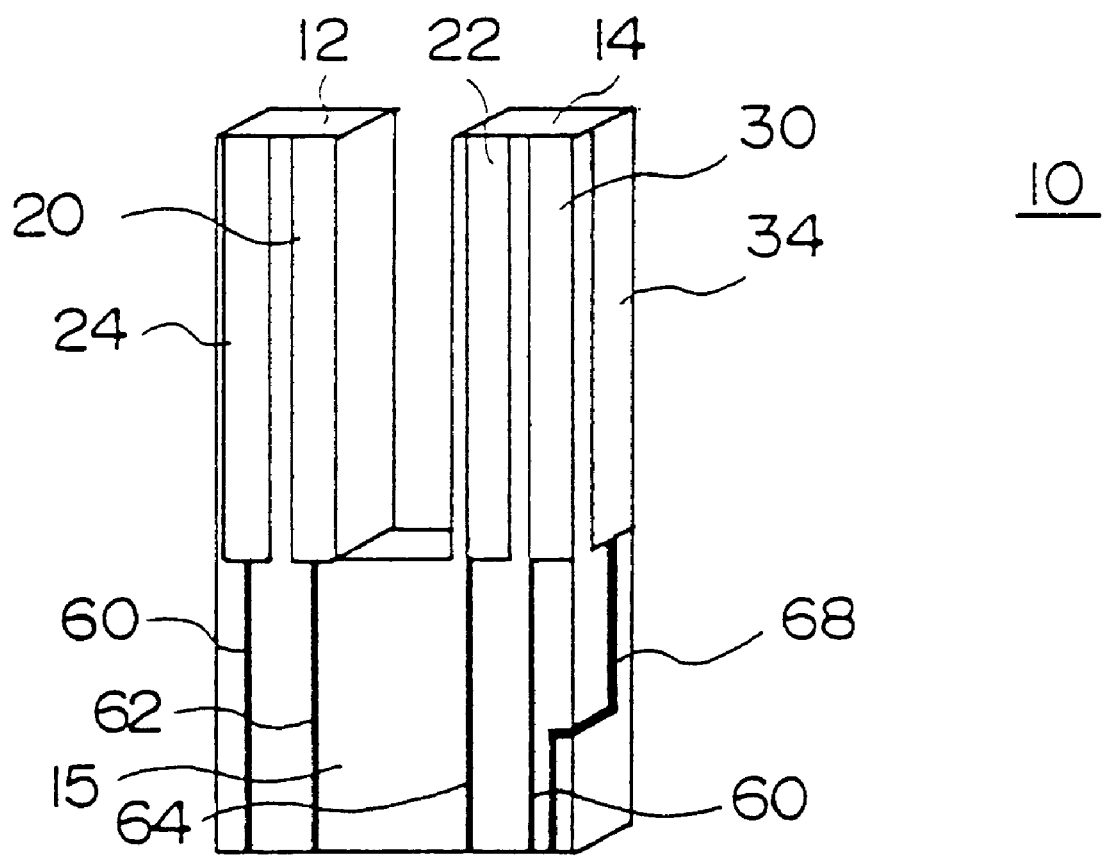
FIG. 11 is a perspective view of a tuning fork used in a fourth embodiment of the present invention.

As shown in FIGS. 10A and 10B, flexible wiring boards 50 and 58 are provided in order to connect the drive electrodes and detection electrodes to the leads provided on the front and back surfaces of the arms 12 and 14. The flexible wiring board 50 includes a base member 52 and a lead portion 54 including a plurality of leads supported by the base member 52. In the example shown in FIGS. 10A and 10B, the lead portion 54 has three leads. As indicated by a reference number 56 shown in FIGS. 10A and 10B, an end of the flexible wiring board 50 is located at the center of the base portion 15 so that the leads 42, 44 and 46 and the corresponding leads of the lead portion 54 are arranged in lines. The leads 42, 44 and 46 are electrically connected to the corresponding leads of the lead portion 54 by soldiering or an electrically conductive adhesive. The operationability of the use of the flexible wiring board 50 and the leads 42, 44 and 46 is superior to that of the conventional wiring bonding. The flexible wiring board 58 provided on the back side of the base portion 15 is configured in the same manner as the above-mentioned flexible wiring board 50 provided on the front side thereof.

A description will now be given, with reference to FIGS. 11, 12, 13A and 13B, of a fourth embodiment of the present invention, which is directed to a unique arrangement in which the above-mentioned flexible wiring boards 50 and 58 are provided on the front and back sides of the supporting base 38.

On the front surface of the base portion 15 of the tuning fork 10, provided are leads 60, 62, 64, 66 and 68, which extend from the leads 20, 24, 22, 30 and 34, respectively. Leads similar to the leads 60, 62, 64, 66 and 68 are provided on the back surface of the base portion 15.

Figure 12:
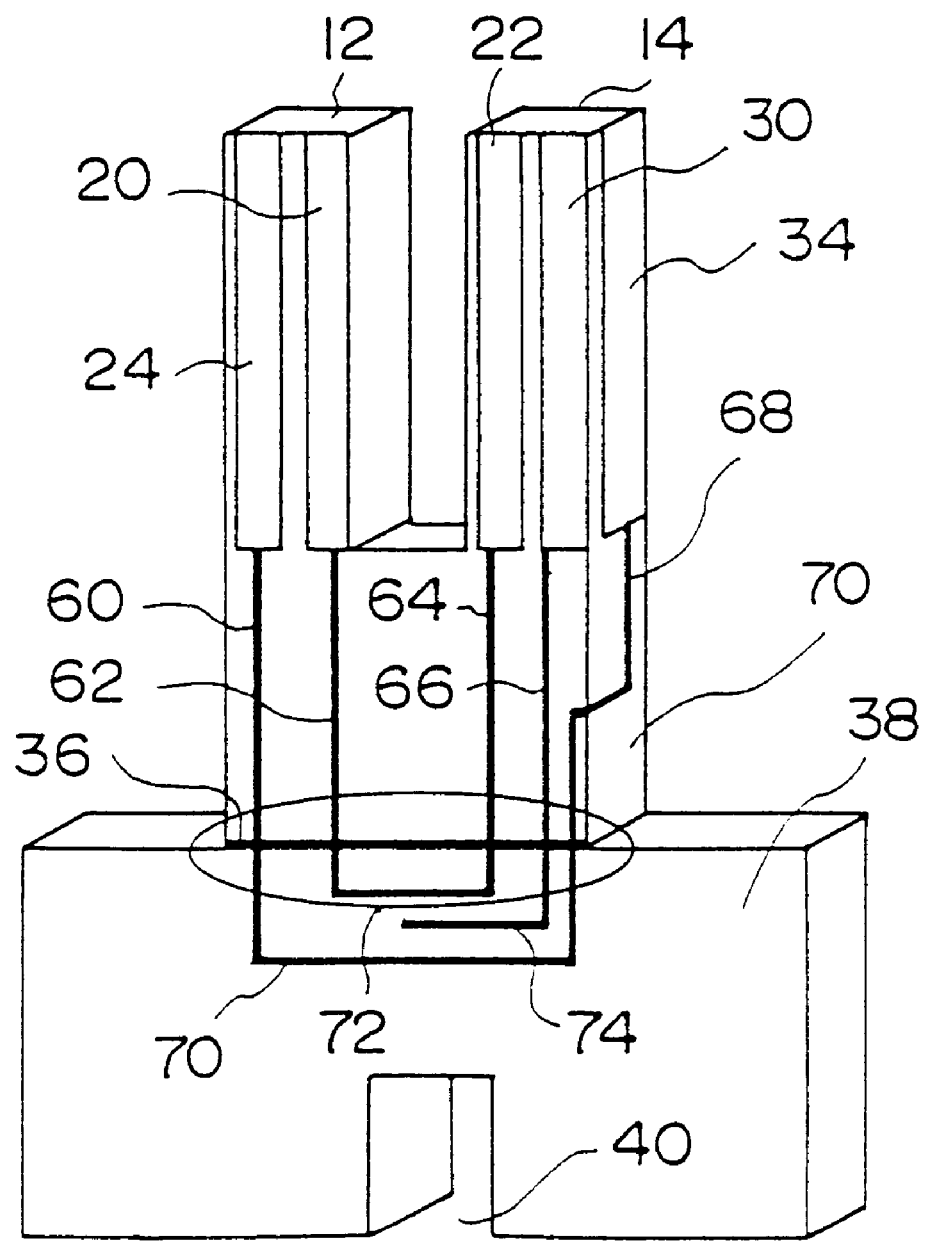
FIG. 12 is a perspective view of the tuning fork and a supporting base used in the fourth embodiment of the present invention.

As shown in FIG. 12, leads 70, 72 and 74 are provided on the front surface of the supporting base 38. The lead 70 electrically connects the leads 60 and 68 together, and the lead 72 electrically connects the leads 62 and 64 together. The lead 74 is connected to the lead 66 and extends to the center of the supporting base 38. A reference number 70 shown in FIG. 12 indicates an interface between the leads on the tuning fork 10 and the leads on the supporting base 38. The connections at the interface are made by soldering or an electrically conductive adhesive. Leads similar to the leads 70, 72 and 74 are provided on the back surface of the supporting base 38.

Figure 13B:
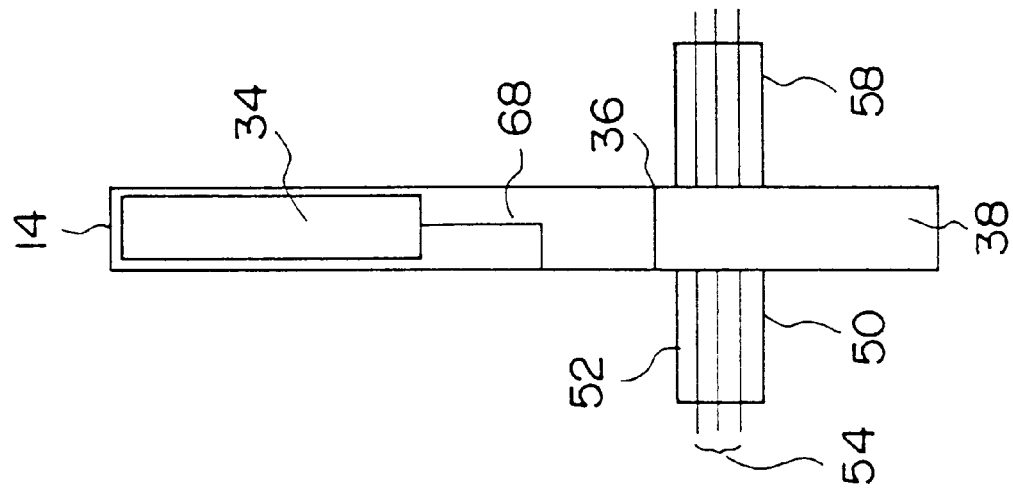
FIGS. 13A and 13B are respectively perspective and side views of a gyroscope according to the fourth embodiment of the present invention.
Figure 13A:
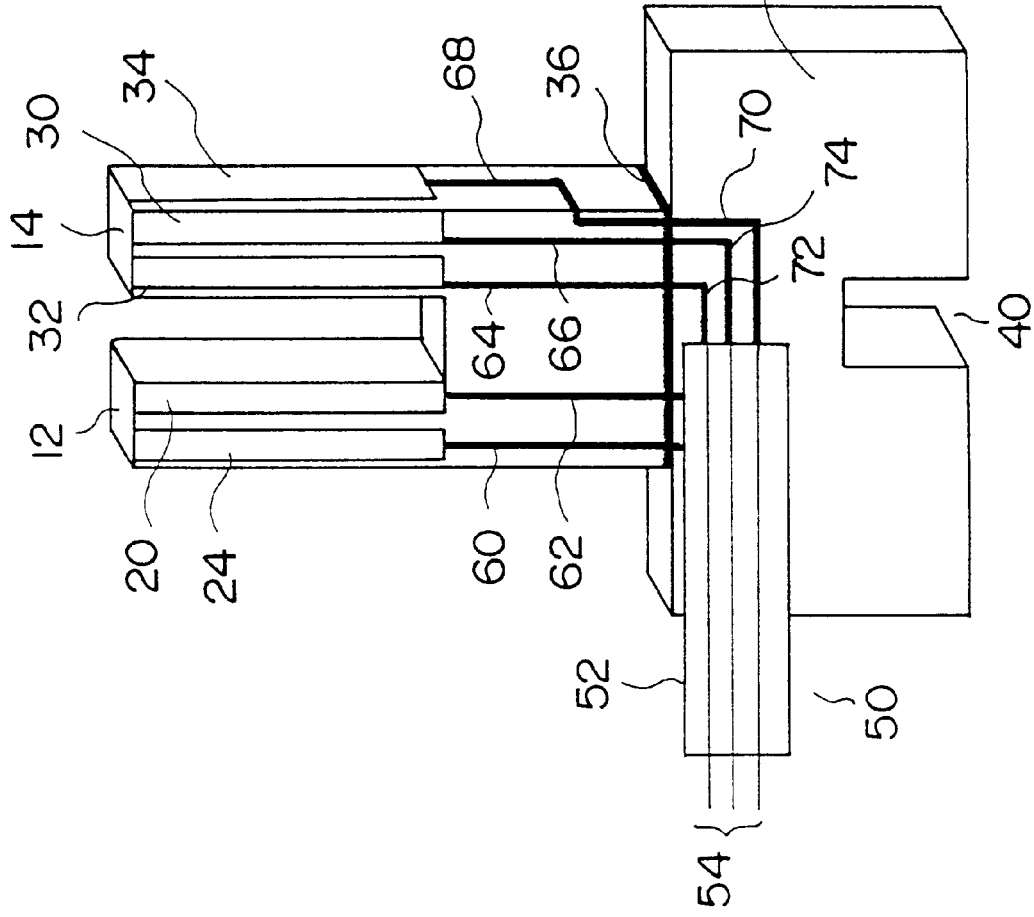

As shown in FIGS. 13A and 13B, the flexible wiring boards 50 and 58 are respectively provided on the front and back sides of the supporting base 38. The leads 70, 72 and 74 provided on the front surface of the supporting base 38 are electrically connected to the leads of the lead portion 54 of the flexible wiring board 50 by soldering or an electrically conductive adhesive. Similarly, the leads provided on the back surface of the supporting base 38 are electrically connected to the leads of the lead portion of the flexible wiring board 58 by soldering or an electrically conductive adhesive.

A description will now be given, with reference to FIGS. 14A, 14B, 15A and 15B, of a fifth embodiment of the present invention, which has an arrangement in which the tuning fork 10 and the supporting base 38 are supported by a stem 78 and are covered by a cap 80.

As shown in FIGS. 14A and 14B, a supporting plate 76 which passes through the slit 40 formed in the supporting base 38 is fixed to the stem 78. The supporting base 38 is fixed to the supporting plate 76 by an elastic adhesive. Hence, the two arms 12 and 14 of the tuning fork 10 face the stem 78 (in other words, the drive-side vibration plane is parallel to a surface 78A of the stem 78. A plurality of pins 79 are attached to the stem 78, and are electrically connected to wiring patterns (not shown) provided on surface 78A of the stem 78. The aforementioned flexible wiring boards 50 and 58 (not shown in FIGS. 14A–15B for the sake of simplicity) are connected to the wiring patterns formed on the surface 78A of the stem 78. As shown in FIG. 15A, the cap 80 is attached to the stem 78 so that it hermetically seals the tuning fork 10 and the supporting base 38.

As sown in FIG. 15B, the tuning fork 10 can be supported so that the drive-side vibration plane is vertical to the surface 78A of the stem 78. In this case, the flexible wiring boards 50 and 58 can easily be positioned and routed, as compared to the arrangement shown in FIG. 15A. However, the cap 80 is required to have a larger size than that shown in FIG. 15A. The supporting plate 76 used in FIG. 15B has an L-shaped or C-shaped cross section, and one or both ends thereof are fixed to the stem 78.

FIGS. 16A and 16B are diagrams showing a variation of the structure shown in FIGS. 14A and 14B. A supporting plate 76A shown in FIGS. 16A and 16B has an approximately C-shaped cross section, and both ends thereof are fixed to the stem 78 by soldering or welding. As shown in FIG. 16B, the supporting plate 76A passes through the slit 38 of the supporting base 38 and is fixed thereto by an adhesive or the like. Since both ends of the supporting plate 76 are fixed to the stem 78, it is thus possible to effectively suppress a vibration of the supporting plate 76A itself.

Figure 17A:
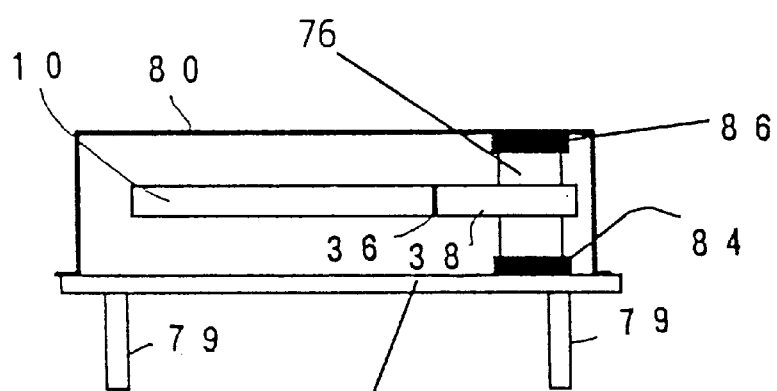
FIG. 17A is a cross-sectional view of a gyroscope according to a sixth embodiment of the present invention.
Figure 17B:
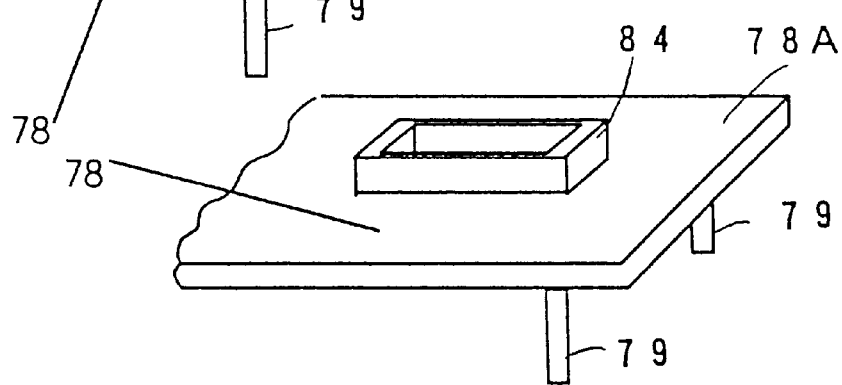
FIG. 17B is an enlarged perspective view of a portion of the gyroscope shown in FIG. 17A.

FIGS. 17A and 17B show a sixth embodiment of the present invention, which is directed to more effectively suppressing a vibration of the supporting plate 76 itself shown in FIGS. 14A and 14B. A recess structure frame 84, which engages with one end of the supporting plate 76, is provided on the surface 78A of the stem 78. A recess structure frame 86, which engages with the other end of the supporting plate 76, is provided on the inner top wall of the cap 80. The supporting plate 76 is interposed between the two recess structure frames 84 and 86 in the assembled state. The supporting plate 76 is supported by the stem 78 and the cap 80, so that the supporting plate 76 can be more effectively suppressed from vibrating.

FIGS. 18A, 18B and 18C show a seventh embodiment of the present invention, which is directed to more effectively suppressing a vibration of the supporting plate 76 shown in FIGS. 14A and 14B as in the case of the sixth embodiment thereof. A supporting plate used in the seventh embodiment of the present invention is indicated by a reference number 76B. The supporting plate 76B includes a first portion b1 and a second portion b2. The first portion b1 is attached to the stem 78, and has a triangular prism or cone shape. The second portion b2 is fixed to the supporting base 38 and a plate shape. The first portion b1 has a comparatively wide area which contacts the stem 78, so that a vibration of the supporting plate 76B itself can be effectively suppressed.

FIGS. 19A, 19B, 19C and 19D show a variation of the seventh embodiment of the present invention, which has a supporting plate 76C. As shown in these figures, the supporting plate 76C has a first portion c1 and a second portion c2. The first portion c1 has a wide area, which contacts the stem 78 and is fixed thereto. Hence, it is possible to effectively suppress a vibration of the supporting plate 76C itself. FIG. 19C shows the supporting plate 76C, which has an L-shaped cross section. FIG. 19D shows the supporting plate 76C, which has a first portion c3 having a T-shaped cross section.

As shown in FIGS. 18A through 19D, the supporting plate is designed to have a wide area which is to contact the stem 78 so that a vibration of the supporting plate itself can be effectively suppressed.

The present invention is not limited to the specifically disclosed embodiments, and variations and modifications may be made without departing from the scope of the present invention.

What is claimed is:

1. A tuning-fork type piezoelectric vibratory gyroscope comprising:

a tuning fork having two arms and a base portion integrally formed with the two arms and having electrodes:

a supporting base supporting the base portion of the tuning fork; and an adhesive layer which joins the base portion and the supporting base together so that the tuning fork and the supporting base are elastically integrated within a temperature range in which the gyroscope is used, and are integrally vibrated due to a Coriolis force.

2. The vibratory gyroscope as claimed in claim 1, wherein:

the adhesive layer comprises one of glass and epoxy resin; and the adhesive layer has a glass transition point temperature higher than a maximum temperature at which the gyroscope can be used.

3. The vibratory gyroscope as claimed in claim 1, wherein an absolute value of a difference between a resonance frequency of a drive-side vibration of the gyroscope and that of a detection-side vibration thereof is equal to or less than a predetermined threshold value.

4. The vibratory gyroscope as claimed in claim 1, wherein an absolute value of a difference between a resonance frequency of a drive-side vibration of the gyroscope and that of a detection-side vibration thereof is equal to or less than 1.3 kHz.

5. The vibratory gyroscope as claimed in claim 1, further comprising:

drive electrodes provided on the tuning fork;

detection electrodes provided on the tuning fork; and at least one flexible wiring board for external connections with the drive and detection electrodes.

6. The vibratory gyroscope as claimed in claim 5, wherein said at least one flexible wiring board is connected to leads provided on the tuning fork and connected to the drive and detection electrodes.

7. The vibratory gyroscope as claimed in claim 5, wherein said at least one flexible wiring board is connected, by soldering or an electrically conductive adhesive, to leads provided on the tuning fork and connected to the drive and detection electrodes.

8. The vibratory gyroscope as claimed in claim 5, wherein said at least one flexible wiring board is connected to leads provided on the supporting base and connected to the drive and detection electrodes.

9. The vibratory gyroscope as claimed in claim 1, wherein:

the supporting base has a slit;

the vibratory gyroscope has a supporting member which passes through the slit and is attached to the supporting base by an elastic adhesive; and the vibratory gyroscope can be attached to a stem so that the two arms of the tuning fork face the stem.

10. The vibratory gyroscope as claimed in claim 9, wherein the supporting member is attached to the stem by one of soldering and welding.

11. The vibratory gyroscope as claimed in claim 1, further comprising a cap which hermetically seals the tuning fork and the supporting base.

12. The vibratory gyroscope as claimed in claim 9, further comprising a cap which hermetically seals the turning fork and the supporting base, the supporting member being fixed to the stem and the cap.

13. The vibratory gyroscope as claimed in claim 9, wherein:

the supporting member has a first portion which is to be fixed to the stem, and a second portion attached to the supporting base; and the first portion has an area or a shape which is greater than that of the second portion.

\* \* \* \* \*

UNITED STATES PATENT AND TRADEMARK OFFICE
CERTIFICATE OF CORRECTION

PATENT NO.   : 6,134,963
DATED        : October 24, 2000
INVENTOR(S)  : Hiroshi Ishikawa et al.

It is certified that error appears in the above-identified patent and that said Letters Patent is hereby corrected as shown below:

<u>Title page,</u>
Item [73], the Assignee information should read as follows:

-- Fujitsu Limited and Fujitsu Towa Electron Limited --.

Signed and Sealed this

Twenty-fifth Day of June, 2002

*Attest:*

*Attesting Officer*

JAMES E. ROGAN
*Director of the United States Patent and Trademark Office*